United States Patent [19]
Nakamura

[11] Patent Number: 5,638,167
[45] Date of Patent: Jun. 10, 1997

[54] METHOD OF MEASURING THE LIGHT AMOUNT OF A DISPLAY PICTURE ELEMENT, DISPLAY SCREEN INSPECTING METHOD AND DISPLAY SCREEN INSPECTING APPARATUS

[75] Inventor: Takashi Nakamura, Shiga, Japan

[73] Assignee: Otsuka Electronics Co., Ltd., Osaka, Japan

[21] Appl. No.: 523,196

[22] Filed: Sep. 5, 1995

[30] Foreign Application Priority Data

Sep. 5, 1994 [JP] Japan .................................. 6-211560

[51] Int. Cl.$^6$ ........................................ G01J 1/00
[52] U.S. Cl. .................. 356/121; 356/394; 348/189
[58] Field of Search .......................... 348/92, 125, 184, 348/189, 190, 191; 356/394, 121

[56] References Cited

U.S. PATENT DOCUMENTS

| | | | |
|---|---|---|---|
| 4,320,462 | 3/1982 | Lund et al. | 364/525 |
| 4,631,676 | 12/1986 | Pugh | 364/413 |
| 4,708,483 | 11/1987 | Lorenz | 356/376 |
| 4,897,721 | 1/1990 | Young et al. | 358/139 |
| 5,293,178 | 3/1994 | Kabayashi | 345/87 |
| 5,319,459 | 6/1994 | Moxhizuki et al. | 348/189 |
| 5,400,135 | 3/1995 | Maeda | 356/237 |

FOREIGN PATENT DOCUMENTS

| | | | |
|---|---|---|---|
| 5-240802 | 9/1993 | Japan | G01N 21/88 |
| 6-11679 | 1/1994 | Japan | G02F 1/13 |

*Primary Examiner*—Frank Gonzalez
*Assistant Examiner*—Zandra V. Smith
*Attorney, Agent, or Firm*—Sughrue, Mion, Zinn, Macpeak & Seas

[57] ABSTRACT

A display screen inspecting method wherein, a plurality of display picture elements are selected, as markers, from a display screen and light receiving picture elements corresponding to the display picture elements are selected. The light amounts of the display picture elements are measured using the light receiving picture elements and each of the light amounts thus measured is fitted to a predetermined function form symmetric with respect to the center thereof such that the center of each display position is obtained. The difference in position between each of the center positions and each of the specified corresponding light receiving picture elements is obtained and based on such positional differences, a strain of the display screen or a positional shift between the display screen and an inspection screen, in terms of a positional function, is obtained. Portions where moiré fringes will occur, are estimated; but the light receiving signals of light receiving picture elements present at the portions where moiré fringes occur. An inspection screen is reconstructed based on the light receiving signals of the remaining light receiving picture element; and there is obtained the relationship between the received light amount of the light receiving picture elements on the inspection screen thus reconstructed and the display light amount of the display picture elements corresponding to the light receiving picture elements.

14 Claims, 4 Drawing Sheets

METHOD OF MEASURING THE LIGHT AMOUNT OF A DISPLAY PICTURE ELEMENT, DISPLAY SCREEN INSPECTING METHOD AND DISPLAY SCREEN INSPECTING APPARATUS

BACKGROUND OF THE INVENTION

The present invention relates to a display picture element measuring method arranged such that, even though there is a positional shift between a display picture element and the corresponding light receiving picture element, the light amount of the display picture element can accurately be measured with neither display picture element nor light receiving picture element moved.

The present invention also relates to a display screen inspecting method and a display screen inspecting apparatus each arranged such that, even though there is a strain of a display screen or a positional shift between the display screen and an inspection screen when inspecting the display screen, there is established, with neither the display screen nor the inspection screen moved, a corresponding relationship between display picture elements and light receiving picture elements such that the light amount of the display picture elements is accurately measured.

Conventionally, a liquid crystal display screen is visually checked for quality. A considerably small display defect or irregularity can be judged even by such a visual inspection. However, the reliability on the evaluation depends on the experience or the like of an inspector. This assures no objectivity on the inspection result. Further, the visual inspection lowers the inspection speed.

To solve such problems, there is proposed an automatic inspecting method using a one-dimensional image sensor (line sensor) or a two-dimensional image sensor (See Japanese Unexamined Patent Publication Nos. 6-11679/1994 and 5-240802/1993).

The former Japanese Unexamined Patent Publication No. 6-11679 discloses the following invention. That is, a display picture element to be inspected is brought to a bright state while other picture elements in the vicinity of the display picture element to be inspected are brought to a dark state. A light receiving device is disposed for receiving the images of these picture elements to generate sensor picture elements, and the respective sensed light amounts of the sensor picture elements are then integrated. The resulting integrated value is considered as the light amount of the picture element to be inspected.

The latter Japanese Unexamined Patent Publication No. 5-240802 discloses the following invention. That is, on the assumption that display picture elements and light receiving picture elements are not always equal in number such that the display picture elements are not corresponding to the light receiving picture elements at 1:1, the positional relationship between a display screen to be inspected and a sensor camera is always set to a reference position, and the sensed light intensity information of a light receiving picture element is multiplied by a corresponding position correction coefficient extracted at the reference position, thereby to generate the light intensity information of the display picture element.

According to the invention of the former Japanese Unexamined Patent Publication No. 6-11679, almost all of the amount of light from the display picture element to be inspected can be detected to lower the amounts of lights from the adjacent picture elements. Accordingly, even though the relative position between the display picture element and the sensor picture element undergo a change more or less, the light amount of the picture element can be inspected. As a matter of fact, however, the sensor picture elements are not arranged leaving no spaces thereamong. Accordingly, there are present lights which do not enter sensor picture elements but are reflected or absorbed. In view of the foregoing, it cannot be said that the inspection precision of the light amount of each picture element is sufficiently accurate.

According to the invention of the latter Japanese Patent Laid-Open Publication No. 5-240802, it is required to precisely set the positional relationship between a display picture element and the sensor camera to the reference position at all times. This is because the setting error at the time when the positional relationship between a display picture element and the sensor camera is set to the reference position, will result in a detection level error. As a matter of fact, however, it is very difficult that, at the level of a picture element size, the display screen and the inspection screen are positionally set in a physically precise manner at the time of inspection. Further, if the display screen or the inspection screen has a strain, a display picture element cannot properly correspond to the light receiving picture element even though the display screen and the inspection screen are positionally set in a physically precise manner. This produces a subtle difference in spatial frequency between the arrangement of picture elements on the display screen and the arrangement of picture elements on the inspection screen. This results in moire fringes to exert a considerable influence upon the inspection.

SUMMARY OF THE INVENTION

It is an object of the present invention to provide a method of measuring the light amount of a display picture element, enabling to achieve an accurate inspection of the light amount of each display picture element.

It is another object of the present invention to provide a display screen inspecting method and a display screen inspecting apparatus by which an accurate inspection can be conducted on each display picture element and on a display screen in its entirety without the inspection screen moved even though there is present a strain of the display screen or a positional shift between the display screen and the inspection screen.

To achieve the objects above-mentioned, the present invention provides a method of measuring the light amount of a display picture element, comprising the steps of: assuming the distribution of the light amount of a display picture element to be a predetermined function having a form symmetric with respect to the center thereof; displaying the display picture element; measuring the amount of light from the display picture element thus displayed, using a plurality of light receiving picture elements close to one another; and fitting the output values of these light receiving signals to the predetermined function form symmetric with respect to the center thereof such that there is obtained the integration value or height of the predetermined function having a form symmetric with respect to the center thereof, thus presuming the light amount of the display picture element.

According to the method above-mentioned, the display light amount of each of the picture elements can accurately be obtained.

Further, when such a measurement is conducted in the same manner on a large number of picture elements, the average display light amount can be obtained. Such an average display light amount can be utilized for setting the threshold value to be used for inspecting the light amount of other display picture elements. Further, when the center coordinates of the predetermined function having a form symmetric with respect to the center thereof, are obtained, the position of the display picture element can also be specified.

According to a display screen inspecting method of the present invention, a plurality of display picture elements are selected as markers, and there are then specified light receiving picture elements corresponding to the display picture elements.

Then, the display picture elements are displayed, and the amounts of lights from the display picture elements are measured using the light receiving picture elements. Each of the light amounts thus measured is fitted to the predetermined function having a form symmetric with respect to the center thereof, thus obtaining the center of each display position. Then, there is obtained the difference in position between each center position and the position of each of the specified corresponding light receiving picture elements.

Thus, there can be informed a positional shift between the display screen and the sensor screen, as well as a strain of the display screen.

Based on the positional shift and strain thus informed, there are presumed portions where moire fringes will occur. The light receiving signals of light receiving picture elements present at the portions where moire fringes occur, are ignored. Based on the light receiving signals of the remaining light receiving picture elements, an inspection screen is reconstructed. This eliminates a moire and a strain of the mechanical system including the optical system.

Excluded from the inspection screen thus reconstructed are the picture elements relating to dark images where moire fringes occur. Thus, the inspection screen represents considerably accurately the shape and brightness of the original image. However, there are positional shifts between the display picture elements and the light receiving picture elements. It is therefore required to make a light amount correction accordingly.

The received light amount of the light receiving picture elements of the reconstructed inspection screen, are presumed using the predetermined function form symmetric with respect to the center thereof which represents the standard light amount of the display picture elements corresponding to the light receiving picture elements. Such presumption can be made when there are known (i) the positional shifts between the display picture elements and the light receiving picture elements, (ii) the function form and (iii) the size (height) of the function form. It is therefore possible to obtain the relationship between the received light amount of the light receiving picture elements and the display light amount of the display picture elements corresponding to the light receiving picture elements.

Thus, there is obtained the relationship between the received light amount of the light receiving picture elements and the display light amount of the display picture elements corresponding to the light receiving picture elements. Accordingly, when a display screen using a back-light for example is operated and there is a display picture element darker or brighter than surrounding display picture elements, it is possible to specify, according to the amount of received light, the position of such a display picture element and to compare the received light amount with the standard light amount (for example, the standard light amount obtained by the method according to Inspection Procedure 1). Thus, the display screen can be inspected with high precision.

It is therefore possible, without the display screen or light receiving means moved, to know a positional shift between a display picture element and the corresponding light receiving picture element and to establish a corresponding relationship between display picture elements and light receiving picture elements. Further, a light amount correction required due to positional shift, can also be made. Thus, the inspection screen can advantageously be reproduced accurately.

A display screen inspecting apparatus according to the present invention is arranged to embody the display screen inspecting method above-mentioned, and comprises a sample holder to which a display screen is to be attached, a camera for taking a photograph of the display screen and a controller for processing a light receiving signal based on the photographing signal of the camera.

These and other features, objects and advantages of the present invention will be more fully apparent from the following detailed description set forth below when taken in conjunction with the accompanying drawings.

DETAILED DESCRIPTION OF THE EMBODIMENTS

Outline of the Inspecting Apparatus

Figure 1:
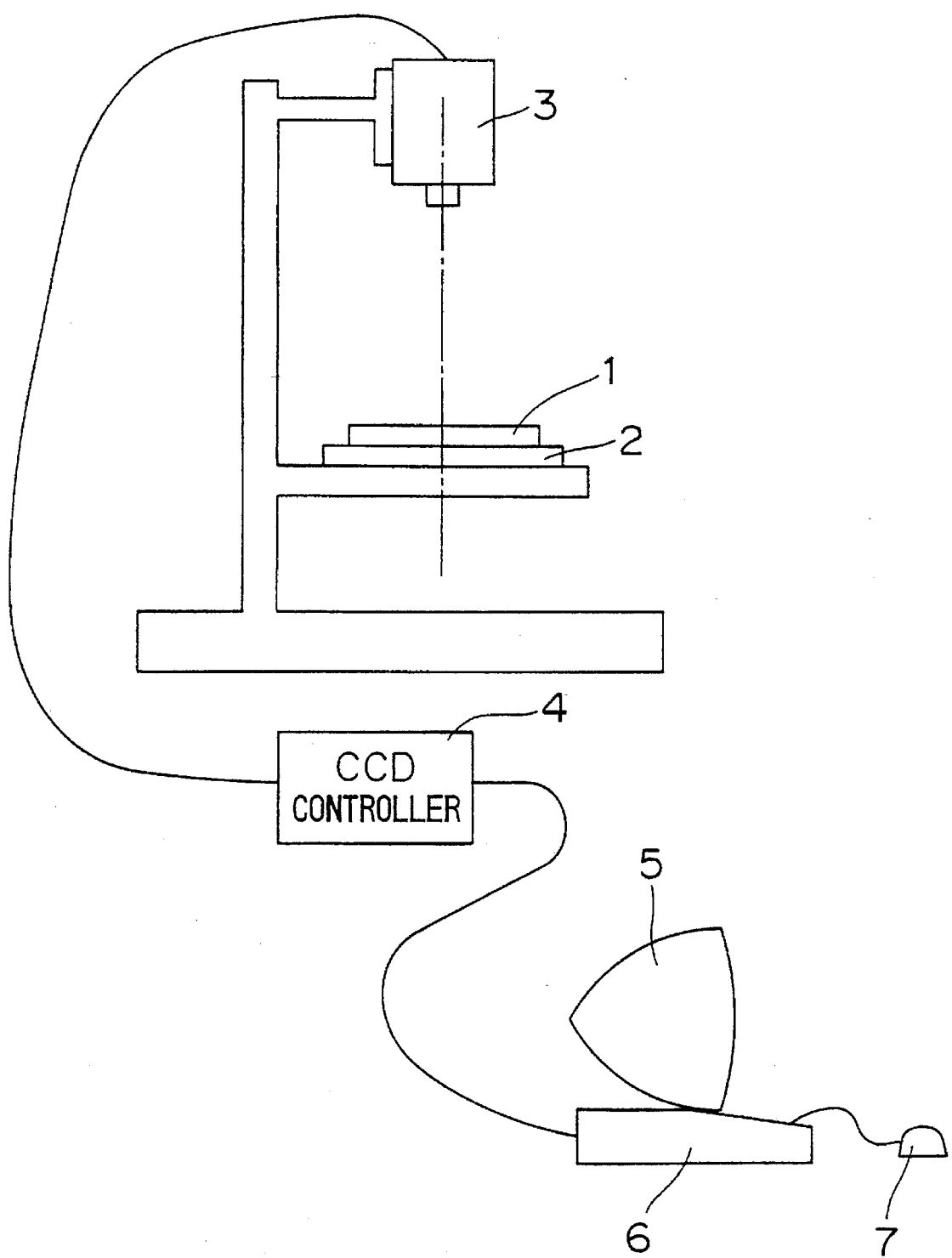
FIG. 1 is a schematic view of an inspection apparatus for inspecting the display screen of a display device.

FIG. 1 is a schematic view of an inspecting apparatus for inspecting the display screen of a liquid crystal display device 1. The liquid crystal display device 1 has display picture elements, for example, 640 picture elements×480 picture elements (1920 (640×3) picture elements×480 picture elements for a color liquid crystal display device). The liquid crystal display device 1 is to be driven by a drive device (not shown). The drive device is arranged to light a back-light and to cause only optional picture elements either to transmit light (bright) or not to transmit light (dark).

The liquid crystal display device 1 is secured to a sample holder 2. The sample holder 2 is vertically and horizontally movable. However, the sample holder 2 is in principle stationary because the present invention is arranged to conduct a measurement without the display screen moved.

However, since it is required to project light such that light receiving picture elements are always somewhat larger in number than display picture elements as will be discussed later, the sample holder 2 is vertically moved in such a range.

A CCD camera 3 for taking a picture of the display screen of the liquid crystal display device 1 is also used as fixed. In the CCD camera 3, the magnification is set such that display picture elements of the liquid crystal display device 1 correspond to light receiving picture elements of the CCD camera 3 at a ratio of 1:m (in which m is equal to 1 or a numeral greater than 1 and very close to 1).

Light receiving signals of the CCD camera 3 are processed by a CCD controller 4, which is controlled by a personal computer system comprising a CRT display 5, a keyboard 6 and a mouse 7. More specifically, there can be recorded (i) which light receiving picture element of the CCD camera 3 has received light, and (ii) how much the amount of received light is.

Inspection Procedure 1

This inspection procedure aims to obtain the display light amount of each display picture element.

An optional picture element is caused to emit light and the CCD camera 3 measures the light thus emitted. Since the display picture element and the corresponding light receiving picture element are somewhat positionally shifted from each other and the camera has a limit in resolution, there are detected not only the light amount of the light receiving picture element corresponding to the display picture element, but also the light amounts of light receiving picture elements in the vicinity of the light receiving picture element above-mentioned.

The distribution of the amount of display light emitted from one picture element is assumed to be a predetermined function form symmetric with respect to the center thereof. For example, any of the following distributions may be considered:

(i) Gaussian distribution of $$f(X)=h \exp\{-\ln 2E(X-X_p)^2/W_G^2\}$$

(h: peak height, X: position coordinate, $X_p$: peak position coordinate, W: half-width of the distribution), (ii) Lorentz distribution of $$f(X)=h/\{1+(X-X_p)^2/W_L^2\}, \text{ and}$$

(iii) a combination of the Gaussian distribution and the Lorentz distribution of $$f(X)=h\int dt \exp\{-\ln 2 \ t^2/W_G^2\}/\{1+(X-X_p-t)^2 W_L^2\}$$

(Integration is conducted for $t=-\infty$ to $t=\infty$)

Figure 2:
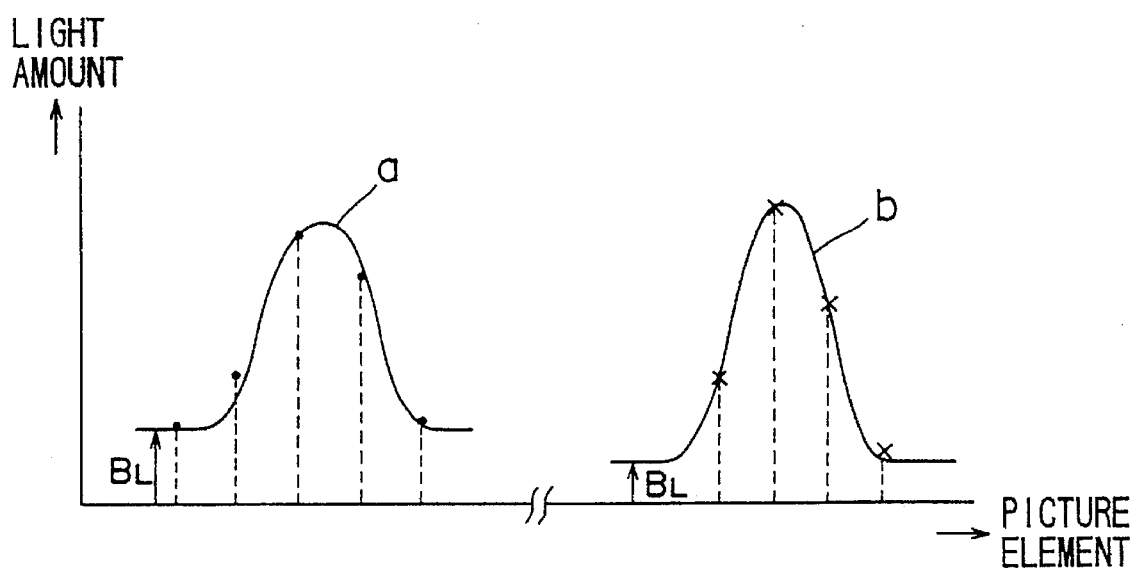
FIG. 2 is a graph showing an example in which each of the distributions in one direction of the amounts of display lights emitted from two separate picture elements, is fitted using a distribution function.

Then, using such a distribution function, the received light amount is fitted by a least squares method. FIG. 2 shows an example in which each of the distributions in one direction of the amounts of display lights emitted from two separate picture elements, is fitted. In FIG. 2, $B_L$ refers to the level of back-light and is shown at a different level dependent on the display position. This represents that the back-light is uneven in intensity. Accordingly, by removing such intensity unevenness, the accurate light amount of a display picture element can be obtained.

Figure 3:
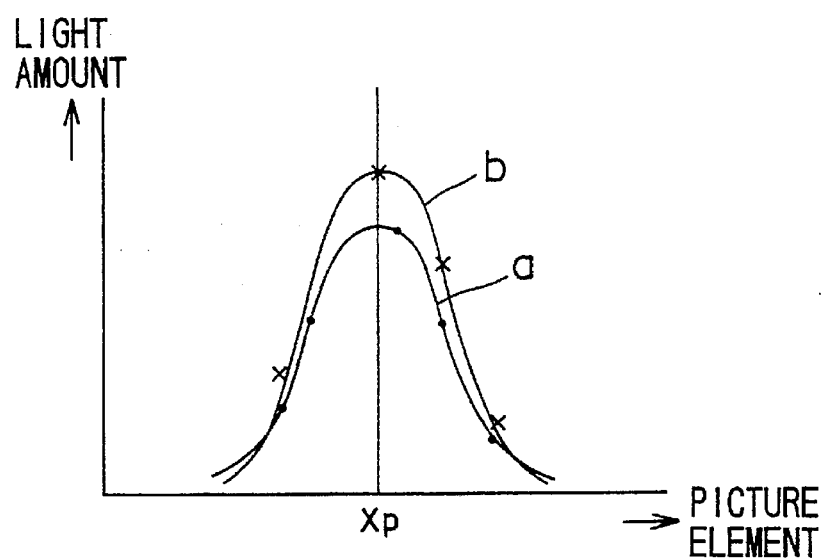
FIG. 3 is a graph in which the distribution functions of display light amounts obtained in FIG. 2, are drawn as over-lapping with the peak position coordinate $X_p$ shared.

In FIG. 3, the distributions of display light amounts thus obtained are drawn as overlapping each other with the peak position coordinate $X_p$ shared. In FIG. 3, the back-light levels are adjusted to the same height. The reason why the distribution functions are different in height, is because the picture elements are slightly different in display light amount and beam extent (half-width) from one another.

When the average of distributions is calculated from the half-widths w and peak heights h of the display light amounts of a number of picture elements, the average display light amount (standard light amount) and half-width of these picture elements can be obtained.

When the standard light amount is once obtained, it is possible to select an optional picture element of the liquid crystal display device 1, to cause the picture element thus selected to emit light, to obtain the display light amount by applying the procedure above-mentioned and to compare the display light amount thus obtained with the standard light amount, thereby to check the picture element for the rate of light permeability.

Figure 4:
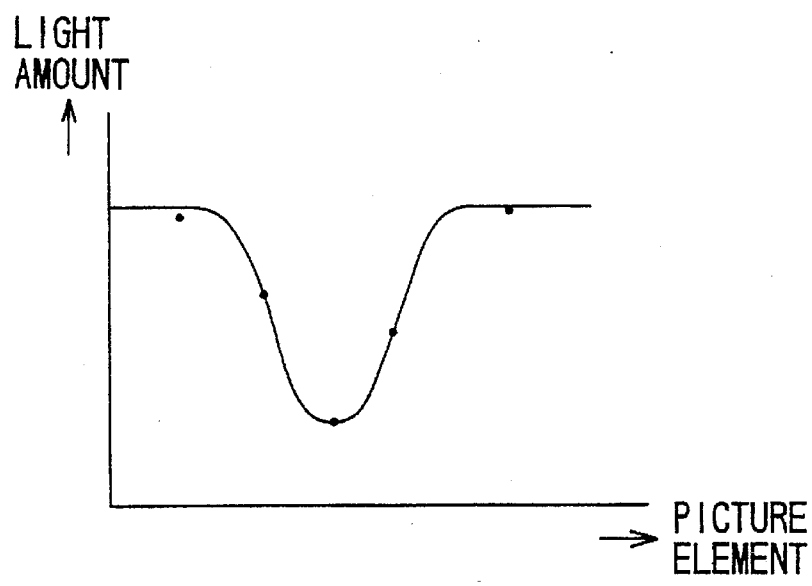
FIG. 4 is a graph showing an example in which the rates of light shielding of a display picture element are fitted using a distribution function in a concave form symmetric with respect to the center thereof.

As to the rate of light shielding of a picture element, the distribution of rates of light shielding of a picture element may be assumed to be a concave function form symmetric with respect to the center thereof as shown in FIG. 4, and the rate of light shielding of a picture element may be checked by applying a procedure similar to that above-mentioned.

Inspection Procedure 2

This inspection procedure aims to accurately obtain a positional shift of a light receiving picture element from the corresponding display picture element in an order less than one picture element and to accurately evaluate the light amount of each display picture element.

At least three display picture elements which are not located in one straight line on the display screen, are selected as markers, and light receiving picture elements corresponding to these display picture elements (hereinafter referred to as marker picture elements) are specified. In this embodiment, display picture elements in the vicinity of corners of the display screen are selected as the marker picture elements. Accordingly, the light receiving picture elements corresponding to the display picture elements are also in the vicinity of corners of the inspection screen.

To check the display screen for strain or positional shift in a finer manner, it is preferable to select four or more marker picture elements.

Each of the marker picture elements is caused to emit light and the CCD camera 3 measures the light thus emitted. In fact, the light receiving picture elements corresponding to the marker picture elements are somewhat positionally shifted therefrom, and the camera has a limit in resolution. Thus, there are detected not only the light amounts of the light receiving picture elements corresponding to the marker picture elements, but also the light amounts of light receiving picture elements in the vicinity of the light receiving picture elements corresponding to the marker picture elements.

The distribution of the amount of display light emitted from one picture element is assumed to be a predetermined function form symmetric with respect to the center thereof. As mentioned earlier, there are considered the Gaussian distribution, the Lorentz distribution and a combination of Gaussian distribution and Lorentz distribution.

Then, likewise in Inspection Procedure 1, using such a distribution function, each received light amount is fitted by a least squares method. Then, the center coordinates of each distribution are obtained and the difference in position between the center coordinates thus obtained and each of the specified corresponding light receiving picture elements.

Since the operations above-mentioned are executed by lighting each of the three marker picture elements, there can be obtained the positional differences for the three points on the screen.

Figure 5:
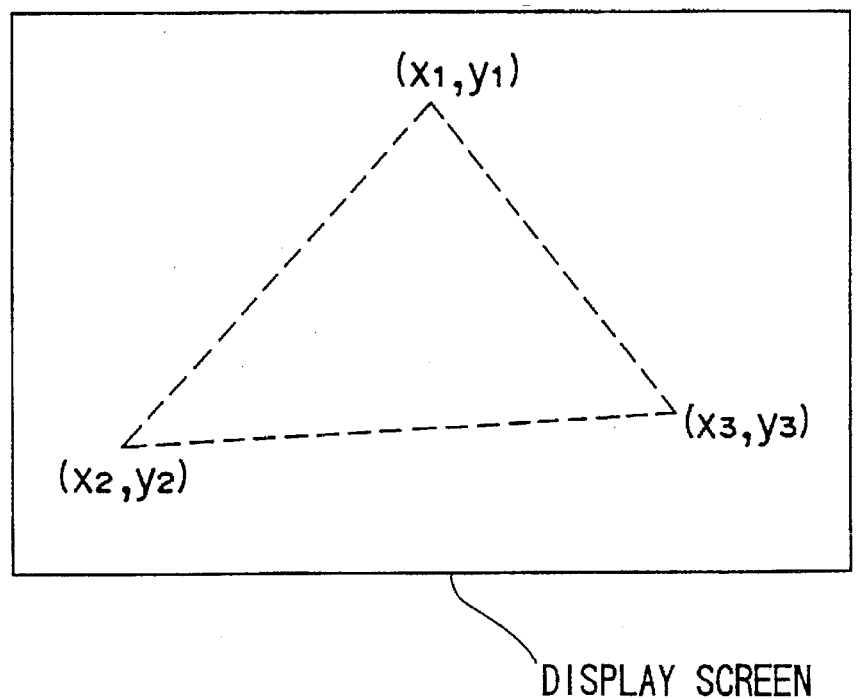
FIG. 5 is a view illustrating positional coordinates of at least three display picture elements selected which are not located in a straight line on a display screen.

Based on the positional differences above-mentioned, strain or positional shift at an optional position on the screen is presumed using a linear interpolation, which will be discussed in the following. As shown in FIG. 5 for example, it is now supposed that the positional coordinates of three marker picture elements are referred to as $(x_1, y_1)$, $(x_2, y_2)$, $(x_3, y_3)$ and differences in position between the marker picture elements and the corresponding light receiving picture elements take place in the same direction by $\Delta_1, \Delta_2, \Delta_3$. Then, the positional shift $\Delta$ at an optional position $(x, y)$ is obtained by the following determinant;

$$\begin{vmatrix} x-x_1 & y-y_1 & \Delta-\Delta_1 \\ x_2-x_1 & y_2-y_1 & \Delta_2-\Delta_1 \\ x_3-x_1 & y_3-y_1 & \Delta_3-\Delta_1 \end{vmatrix} = 0$$

By Such a linear interpolation, it is possible to presume the positional shift at the optional position on the screen, i.e., the number of picture elements positionally shifted in the direction above-mentioned (including a positional shift less than one picture element).

The positional shifts $\Delta_1, \Delta_2, \Delta_3$ from the marker picture elements do not always take place in the same direction, but it is expected that such positional shifts take place in random directions (in two-dimensional vectors). In such a case, the positional shift $\Delta$ may be obtained as divided into an x-component and a y-component in two directions, and the x- and y-components may finally be composed.

The repeat spatial frequency of a display picture element is now referred to as N. Generally, N is vector and a positional function. For simplification, however, N is now supposed to be scalar and a constant. There is considered a case where a positional shift of the inspection screen linearly changes as the corresponding light receiving picture element is separated in a predetermined direction from a certain position. In such a case, the spatial frequency of the light receiving picture element in the same direction becomes N' (constant, ≠N). Accordingly, the spatial frequency of the moire fringes formed when the distributions of both picture elements overlap each other, is equal to (N–N') and the moire fringes periodically appear.

Here, the moire fringes appear both when N is greater than N' and when N is smaller than N'. According to the present invention, however, N is required to be smaller than N'. This is because the light receiving picture elements are larger in number than the display picture elements since there are ignored the light receiving signals of the light receiving picture elements present at the portions where the moire fringes are generated, as will be discussed later.

Accordingly, no measurement can be made in a case where the inspection screen is reduced as compared with the display screen, i.e., where N is greater than N'. It is therefore required to set again the position of the sample holder 2 to the magnification enlarging direction such that the magnification of the CCD camera 3 is set such that N is smaller than N'.

There are specified the light receiving picture elements each located Just between adjacent display picture elements. Such light receiving picture elements are the least in the amount of lights received from the display picture elements, and are picture elements present on the dark lines of the moire fringes. Such light receiving picture elements repeatedly appear periodically at spatial frequency N–N'. Accordingly, the light receiving signals from these light receiving picture elements are excluded.

Figure 6:
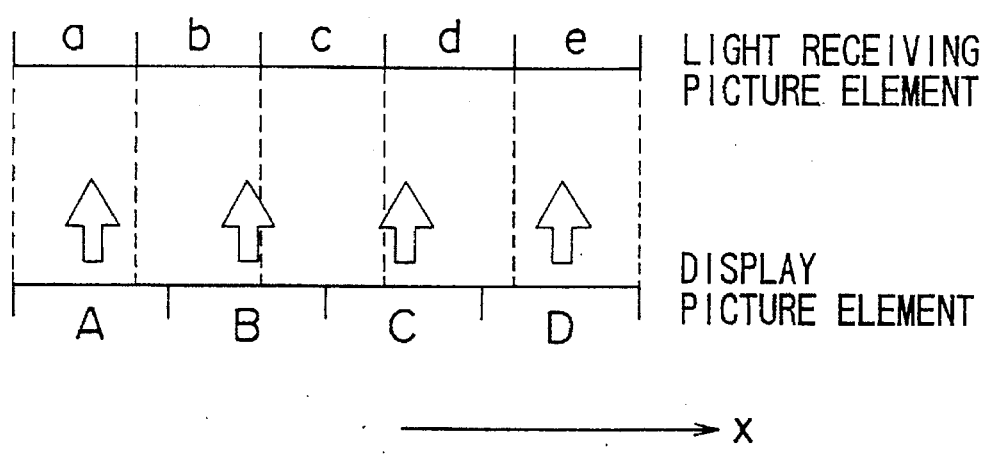
FIG. 6 is a view illustrating a state in which four display picture elements A, B, C, D are arranged in the x direction and five light receiving picture elements a, b, c, d, e corresponding thereto are arranged also in the x direction.

For simplification, FIG. 6 shows a state where four display picture elements A, B, C, D are arranged in the x direction and corresponding five light receiving picture elements a, b, c, d, e are arranged in the x direction. Since the center light receiving picture element c is located between two display picture elements B, C, the signal from the center light receiving picture element c is to be excluded.

A sensor image reconstructed with a portion of the light receiving picture elements excluded, represents the shape and brightness of the original image since there are excluded image portions relating to the dark picture elements where moire fringes are generated.

Then, it becomes necessary to again establish the corresponding relationships between the light receiving picture elements on the reconstructed screen and the display picture elements. Since there are excluded the light receiving picture elements each located just between adjacent display picture elements as discussed in the foregoing, there must be always present the corresponding display picture elements each of which is located in the closest position to each of the remaining light receiving picture elements. In the example in FIG. 6, the display picture elements A, B, C, D respectively correspond to the light receiving picture elements a, b, d, e. Thus, with the display picture elements corresponding to these light receiving picture elements, the positional shifts $\Delta$ of the light receiving picture elements from the corresponding display picture elements are obtained. It is noted that these positional shifts $\Delta$ have already been obtained by the previous procedure.

Figure 7:
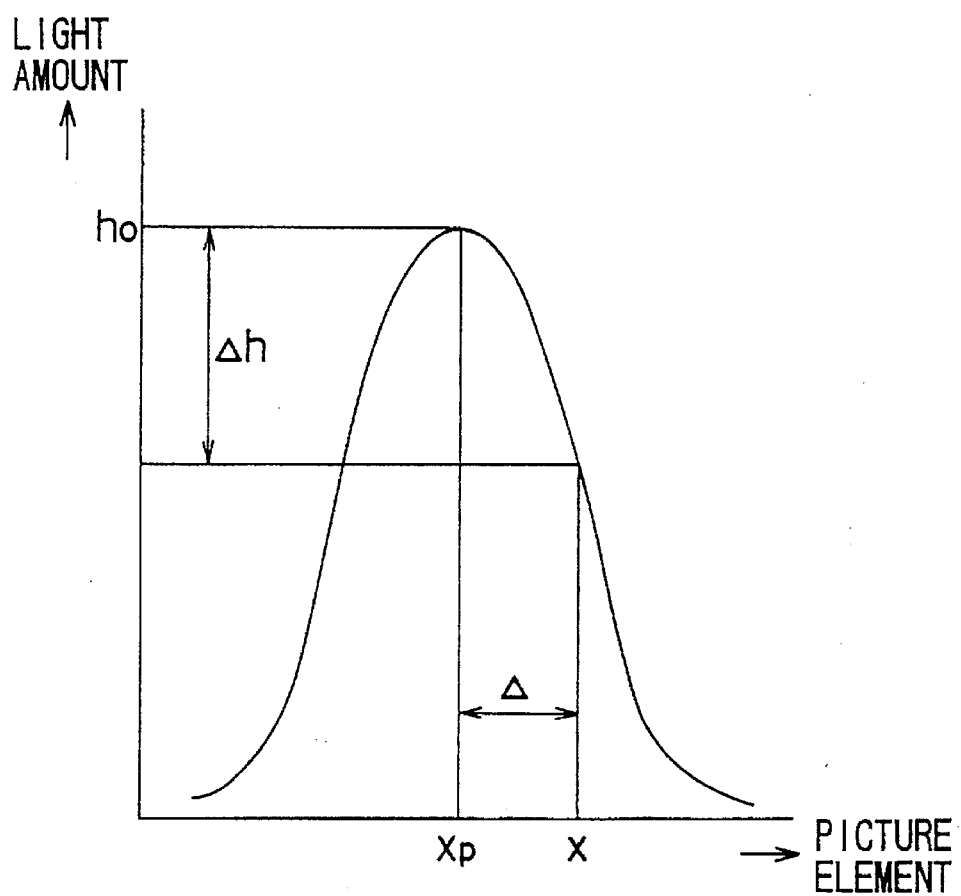
FIG. 7 is a graph illustrating a method of correcting the light amount based on a positional shift Δx.

Then, a light amount correction is executed based on each of these positional shifts $\Delta$. More specifically, as shown in FIG. 7, there may be obtained the light amount at the position where each positional shift $\Delta$ is added to the peak position coordinate $X_p$ of the standard light amount distribution function obtained by Inspection Procedure 1.

Thus, there is obtained a difference in light amount $\delta h$ between the received light amount of a light receiving picture element and the display light amount of the display picture element corresponding to the light receiving picture element above-mentioned.

Then, the display screen is to be inspected.

If the display screen is lighted by the back-light and there are scatteringly present dark display picture elements and/or bright display picture elements, positional shifts $\Delta$ are obtained based on the reconstructed inspection screen and such abnormal picture elements are specified.

Then, the difference in light amount $\Delta h$ is added to the received light amount of each of the corresponding light receiving picture elements, thereby to presume the actual light amount of each of the abnormal picture elements.

Thus, by comparing the light amount of a display picture element with the standard light amount, each of the picture elements on the display screen can be inspected.

What is claimed is:

1. A method of measuring light intensity from a selected one of a plurality display picture elements on a display screen, comprising the steps of:

assuming a distribution of the light intensity from a display picture element to be a predetermined function having a form symmetric with respect to a center thereof;

measuring the amount of light emitted from said display picture element using a plurality of light receiving picture elements that are disposed close to one another and are operative to generate output values; and fitting said output values of said light receiving elements to said predetermined function having a form symmetric with respect to a center thereof such that the light intensity from said display picture element is measured.

2. The method of claim 1 wherein said predetermined function is a Gaussian distribution.

3. The method of claim 1 wherein said predetermined function is a Lorenz distribution.

4. The method of claim 1 wherein said fitting step is conducted by the least squares method.

5. The method of claim 1 further comprising comparing the measured display light amount with a standard light amount to check the picture element for rate of light permeability.

6. The method of claim 1 further comprising comparing the measured display light amount with a standard light intensity to check the rate of light shielding of a picture element.

7. A display screen inspecting method comprising the steps of:

selecting a plurality of display picture elements from a display screen;

specifying light receiving picture elements corresponding to said display picture elements;

displaying said plurality of display picture elements to provide display picture elements;

measuring the light intensity from said display picture elements using said light receiving picture elements to produce light intensity measurements;

fitting each of said light intensity measurements to a predetermined function having a form symmetric with respect to a center thereof such that a center of each display position is obtained;

obtaining the difference in position between each of said center positions and each of said specified corresponding light receiving picture elements;

obtaining, based on said positional differences thus obtained, a strain of said display screen or a positional shift between said display screen and an inspection screen, in terms of a positional function;

estimating portions where moiré fringes will occur;

ignoring the light receiving signals of light receiving picture elements present at said portions where moiré fringes occur;

reconstructing an inspection screen based on the light receiving signals of the remaining light receiving picture elements; and obtaining, with the use of said predetermined function form symmetric with respect to the center thereof, the relationship between the received light of the light receiving picture elements on said inspection screen thus reconstructed and the display light amount of the display picture elements corresponding to said light receiving picture elements.

8. The method of claim 7 wherein said predetermined function is a Gaussian distribution.

9. The method of claim 7 wherein said predetermined function is a Lorenz distribution.

10. The method of claim 7 wherein said fitting step is conducted by the least squares method.

11. A display screen inspecting apparatus comprising: a sample holder to which a display screen is to be attached; a camera for taking a picture of said display screen; and a controller for processing a light receiving signal based on a photographing signal of said camera, said controller comprising:

means for obtaining, for an inspection screen, a strain of said display screen or a positional shift between said display screen and said inspection screen, in terms of a positional function;

means for ignoring the light receiving signals of light receiving picture elements present at portions where moiré fringes occur, and for reconstructing an inspection screen based on the light receiving signals of the remaining light receiving picture elements; and means for obtaining the relationship between the received light amount of the light receiving picture elements on the reconstructed inspection screen and the display light amount of the display picture elements corresponding to said light receiving picture elements.

12. The method of claim 11 wherein said predetermined function is a Gaussian distribution.

13. The method of claim 11 wherein said predetermined function is a Lorenz distribution.

14. The method of claim 11 wherein said fitting step is conducted by the least squares method.

* * * * *